(12) United States Patent
Henriquel et al.

(10) Patent No.: US 12,715,170 B2
(45) Date of Patent: Aug. 25, 2026

(54) METHOD FOR MANUFACTURING A PHA CONTAINER

(71) Applicant: SOCIETE DES PRODUITS NESTLE S.A., Vevey (CH)

(72) Inventors: Laurent Henriquel, Epinal (FR); Charlyse Pouteau, Vittel (FR); Johannes Zimmer, Lausanne (CH); KArson Durie, Athens, GA (US)

(73) Assignee: Societe des Produits Nestle S.A., Vevey (CH)

( * ) Notice: Subject to any disclaimer, the term of this patent is extended or adjusted under 35 U.S.C. 154(b) by 126 days.

(21) Appl. No.: 18/694,297

(22) PCT Filed: Sep. 16, 2022

(86) PCT No.: PCT/EP2022/075735

§ 371 (c)(1),
(2) Date: Mar. 21, 2024

(87) PCT Pub. No.: WO2023/046579

PCT Pub. Date: Mar. 30, 2023

(65) Prior Publication Data

US 2025/0128465 A1 Apr. 24, 2025

(30) Foreign Application Priority Data

Sep. 22, 2021 (EP) .................................... 21198301

(51) Int. Cl.
*B29C 49/00* (2006.01)
*B29C 49/12* (2006.01)
(Continued)

(52) U.S. Cl.
CPC .......... *B29C 49/0006* (2022.05); *B29C 49/12* (2013.01); *B29C 49/18* (2013.01);
(Continued)

(58) Field of Classification Search
CPC ........................ B29C 49/0006; B29C 49/6418
See application file for complete search history.

(56) References Cited

U.S. PATENT DOCUMENTS 3,398,427 A * 8/1968 John ..................... B65D 1/323 425/149
4,348,167 A * 9/1982 Virog, Jr. ................ B29C 49/18 425/530

(Continued)

OTHER PUBLICATIONS

Anonymous "Polyhydroxybutyrate" Wikipedia, Apr. 9, 2014, retrieved from the Internet at http://en.wikipedia.org/w/index.php?title=Polyhydroxybutyrate&oldid=603421302, XP055141395, 5 pages.

(Continued)

*Primary Examiner* — Alison L Hindenlang
*Assistant Examiner* — Alexander A Wang
(74) *Attorney, Agent, or Firm* — K&L Gates LLP

(57) ABSTRACT

The invention relates to a method for manufacturing a plastic container, the method comprising the following steps: o providing an injected preform, o heating the preform (S2), and o performing stretch blow molding (S3) of the preform, thereby forming the container. The preform is made of a material comprising 40 to 99.9 weight percent of Polyhydroxyalkanoate (PHA). In the heating step, the preform is brought to a temperature comprised in a range between 1° C. and 20° C. under the melting temperature of the PHA. The present invention thus makes it possible to perform ISBM of Polyhydroxyalkanoate to produce a plastic container.

19 Claims, 3 Drawing Sheets

(51) Int. Cl.

| | |
|---|---|
| ***B29C 49/18*** | (2006.01) |
| ***B29C 49/64*** | (2006.01) |
| ***C08G 63/06*** | (2006.01) |
| *B29K 67/00* | (2006.01) |
| *B29L 31/00* | (2006.01) |

(52) U.S. Cl.

CPC .......... *B29C 49/6418* (2013.01); *C08G 63/06* (2013.01); *B29K 2067/00* (2013.01); *B29L 2031/7158* (2013.01); *C08G 2230/00* (2013.01); *C08G 2390/00* (2013.01)

(56) References Cited

U.S. PATENT DOCUMENTS 5,585,065 A * 12/1996 Nakamaki ........... B29C 49/6472 425/526
2003/0098526 A1* 5/2003 Krishnakumar ........ B29C 49/66 264/516
2009/0099313 A1 4/2009 Uradnisheck
2011/0024954 A1 2/2011 Uradnisheck et al.
2012/0018929 A1 1/2012 Uradnisheck et al.
2012/0108743 A1* 5/2012 Krishnaswamy ...... C08G 63/91 525/450
2022/0033649 A1* 2/2022 Johnson .................. C08L 67/02
2022/0089863 A1* 3/2022 Durie ...................... C08L 67/04
2022/0324147 A1* 10/2022 Tsuchiya ................. B29B 11/08

OTHER PUBLICATIONS

Anonymous "Polyhydroxyalkanoates" Wikipedia, Feb. 9, 2022, retrieved from the Internet at https://en.wikipedia.org/wiki/Polyhydroxyalkanoates, XP055904244, 6 pages.

* cited by examiner

Pressure (bar)
0
1
2
3
4
5
6
7
8
9
10
Time (m.s.)
1
1000
2000
3000
4000
5000
6000
7000
8000
9000
PBS
BS

METHOD FOR MANUFACTURING A PHA CONTAINER

CROSS REFERENCE TO RELATED APPLICATIONS

The present application is a National Stage of International Application No. PCT/EP2022/075735, filed on Sep. 16, 2022, which claims priority to European Patent Application No. 21198301.0, filed on Sep. 22, 2021, the entire contents of which are being incorporated herein by reference.

FIELD OF THE INVENTION

The present invention concerns the technical field of packaging, and more particularly of beverage packaging. The present invention relates to a method for producing plastic containers, such as bottles for water or beverages.

BACKGROUND OF THE INVENTION

The bottles, used to store a product such as a liquid, that are commercially available are mainly manufactured starting from a preform to which a desired shape is given. The preform is a hollow element, generally having a shape similar to the shape of a test tube and made of a thermoplastic resin.

The bottles are usually manufactured by using a method comprising the following steps: injection of thermoplastic resin into a mold to create the preform, heating the preform at a temperature below its recrystallization point and blow-molding of the preform. This method is called "injection stretch blow molding" and can be designated by its acronym "ISBM".

The packaging industry is a major contributor to the plastic pollution issue of oceans and shores. Plastic beverage containers greatly contribute to the visibility of this problem.

Indeed, most of the beverage bottles are made of Polyethylene terephthalate (PET). Even though recyclable, conventional PET is neither bio-sourced nor biodegradable. Consequently, PET containers that end up unintentionally in the environment will not naturally degrade (or only so in an extremely long time) and hence contribute to plastic pollution.

The above-mentioned injection stretch blow molding (ISBM) process is a thermo-mechanically complex process tailored for PET processing. While ISBM has many advantages over the other known method to produce plastic containers such as bottles, it is difficult to replace PET by a bio sourced and biodegradable material in an ISBM process.

During the blow molding process, preforms for bottles and containers made from poly(ethylene terephthalate) (PET) are heated above the glass transition temperature (Tg), wherein there is little deformation of the preform from the original form. Glass transition temperature Tg refers to the point at which amorphous regions of a polymer are converted from a brittle, glasslike state to a rubbery, flexible form.

Additionally, PET will self-regulate upon blow molding, and as a result, the blow molded PET containers have a homogenous thickness distribution. PET-based preforms will however have different thicknesses along the preform to initiate the preform deformation at the right points and to contribute to the homogenous distribution of the material.

For example, Polyhydroxyalkanoates (PHA) is a bio-sourced and bio-degradable, possibly food grade, material that could be advantageously used to produce beverage containers. But PHA is deemed to be incompatible with the ISBM process. More particularly, ISBM is so far only used with conventional plastic materials like PET and Polypropylene (PP), or with industrially compostable plastics such as Polylactic acid plastics (PLA).

For the PHA preforms to be pliable, the preforms must be heated near the melting temperature of PHA, which causes the PHA material to begin to flow and deform from the original design of the preform.

PHA has a sticky behavior in the desired grade for ISBM. At this temperature, built in stresses from injection relax and the preform shrinks significantly. In a typical reheat stretch blow molding setup, with a preform design typically used in PET blow molding, a PHA preform will shrink down to nearly half its size once reheated to a temperature needed for pliability. Consequently, the stretch ratios are higher and blowing is more difficult. In addition, the shrinking is not axial-symmetric and the low preform stability in this shape complicates the transfer from oven or heating apparatus to blowing station.

Additionally, there is no self-regulation in PHA-based materials as there is with PET materials, so once the material becomes pliable, the PHA material will flow irregularly, giving discrepancies in material distribution in the preform and in the final container. The irregular flow of the PHA preform is a problem as the preform will have thinner areas that are more prone to blow-out or the container made from the PHA preforms will have thickness discrepancies throughout the container.

Finally, when reheating a PHA-based preform material, the PHA material absorbs a significant amount of the irradiation, with thicker areas requiring more heat to become pliable than thinner areas. With a PHA-based material molded into a PET-based preform, the different thicknesses along the length of the preform result in a temperature differential, which can cause the material to be more prone to blow-outs during the molding process.

To produce containers made of PHA, a known alternative to ISBM is Extrusion Blow Molding (EBM).

In extrusion blow molding, a continuous parison is axially (vertically) extruded, clamped into a cavity and blown radially to form a container. However, a disadvantage of EBM is that there is less stretching of the material (compared to ISBM) during the container molding due to the absence of axial elongation of the material. Molecular orientation in the material caused by stretching is less present in containers obtained by EBM than in containers obtained by ISBM. Such molecular orientation stiffens the material and makes it possible to produce very thin-walled bottle. Less material is thus necessary to obtain the desired wall stiffness.

Furthermore, there is more material waste in EBM processes than in ISBM processes, due to the required trimming of the clamped parts after blowing. Additionally, when the container has a neck, its geometry and finish are less precise compared to those of a neck obtained in an ISBM process.

Lastly, there is a large number of ISBM machines already available in the beverage industry, and changing the production process of the bottles would require very high investment.

The present invention aims at providing a method for producing plastic containers (in particular plastic beverage containers such as bottles) that solves at least one above-mentioned problems.

SUMMARY OF THE INVENTION

The present invention concerns a method for manufacturing a plastic container. The method comprises the following steps:

providing an injected preform, heating the preform, and performing stretch blow molding of the preform, thereby forming the container.

According to this method, the preform is made of a material comprising 40 to 99.9 weight percent of Polyhydroxyalkanoate (PHA), and in the heating step, the preform is brought to a temperature comprised in a range between 1° C. and 20° C. under the melting temperature of the PHA.

The present invention thus makes it possible to perform ISBM of Polyhydroxyalkanoate to produce a plastic container. After a PHA preform is obtained, the stretch blow molding of the preform is performed, with adapted parameters, near the melting temperature of the PHA used, in its vitreous transition range, which is a very narrow range. The material used (PHA) is a bio-sourced and biodegradable material.

Blow molding is also preferable over injection molding for containers, as it is easier to make extremely thin walls in a blow molding process. Thin walls mean less PHA in the final product, and production cycle times are often shorter, resulting in lower costs through material conservation and higher throughput.

The PHA used can have random monomeric repeating units having of the formula

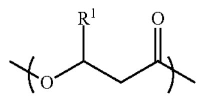

wherein $R^1$ is selected from the group consisting of CH3 and a C3 to C19 alkyl group.

The container can comprise, for example, from about 40 to about 99 weight percent of poly(hydroxyalkanoate) copolymer. The poly(hydroxyalkanoate) copolymer can comprise poly-3-hydroxybutyrate-co-3-hydroxyhexanoate (P3HB-co-P3HHx).

The container can further comprise from 0 to 15.0 weight percent of at least one poly(hydroxyalkanoate) comprising from 25 to 50 mole percent of a poly(hydroxyalkanoate) selected from the group consisting of poly(hydroxyhexanoate), poly(hydroxyoctanoate), poly(hydroxydecanoate), and mixtures thereof.

The container can further comprise poly(hydroxyalkanoate)s comprising a terpolymer made up from 75 to 99.9 mole percent monomer residues of 3-hydroxybutyrate, from 0.1 to 25 mole percent monomer residues of 3-hydroxyhexanoate, and from 0.1 to 25 mole percent monomer residues of a third 3-hydoxyalkanoate selected from the group consisting of poly(hydroxyhexanoate), poly(hydroxyoctanoate), poly(hydroxydecanoate), and mixtures thereof.

These preferred PHA grades can successfully be used in a process according to the invention.

More particularly, the PHA used can be a neat co-polymer of polyhydroxybuterate and polyhydroxyhexanoate. This co-polymer can be hydroxybutyrate-co-3-hydroxyhexanoate (P3HB-co-P3HHx).

The PHA used can be for example:

a poly(hydroxybutyrate-co-hydroxyhexanoate) (PHBHH) containing 97 mol % of polyhydroxybutyrate (PHB) and 3 mol % of polyhydroxyhexanoate (PHH), a poly(hydroxybutyrate-co-hydroxyhexanoate) (PHBHH) containing 94 mol % of polyhydroxybutyrate (PHB) and 6 mol % of polyhydroxyhexanoate (PHH), a poly(hydroxybutyrate-co-hydroxyhexanoate) (PHBHH) containing 91 mol % of polyhydroxybutyrate (PHB) and 9 mol % of polyhydroxyhexanoate (PHH).

One of the above-mentioned additive can be added to the neat PHA. The additive (comprising one component of a mix of components) provides better features to the material for ISBM.

In the heating step the preform is brought to a temperature between 150° C. and 170° C.

The stretch blow molding of the preform made of PHA is thus performed at a much higher temperature than the stretch blow molding of a preform made of PET. The temperature range in which the stretch blow molding is performed, which depends on the PHA grade that is used, is much narrower than the temperature range used for conventional stretch blow molding of PET.

The stretch blow molding can comprise a pre-blowing step in which air is injected at a pressure comprised between 0.1 and 9 bars. The pre-blowing step can last between 0.5 s and 6 s.

The pre-blowing step, in which the PHA preform adopts the general shape of the final container, is thus performed generally at a lower average pressure than a pre-blowing step of a stretch blow molding process that uses a similar PET preform. More particularly, the maximum pressure reached during the pre-blowing step is much lower than the maximum pressure during a pre-blowing step of a stretch blow molding process that uses a similar PET preform.

The stretch blow molding can comprise a blowing step wherein air is injected at a pressure comprised between 0 and 15 bars. The blowing step can last between 0 s and 4 s. The optional blowing step makes it possible to provide the container with the details of its final shape.

The stretch blow molding can comprise injecting air through a section restriction comprised between 0.2 $mm^2$ and 20 $mm^2$.

A limited airflow reduces the deformation speed of the preform. The deformation speed of the preform can thus be adjusted to a suitable value, depending on the PHA grade that is used.

The section restriction used to limit the airflow can be provided by a valve, having for example a circular cross-section comprised between 0.5 mm and 5 mm.

In embodiments of the method, the preform can have a tubular general shape and extends along a longitudinal axis, the preform comprising a neck portion, a body portion and an base portion, the body portion and the base portion being deformed during the step of performing a stretch blow molding of the preform, and the preform can have a diameter comprised between 30% and 60% of the length of the body portion and base portion, measured along the longitudinal axis (A1), preferably around 45% of its length. The preform weighs for example between 20 g and 80 g, preferably between 20 g and 30 g.

The preform used for PHA stretch blow molding is thus configured to require a lower ratio of axial to radial stretch ratios to take the final shape of the formed container, compared to a corresponding PET preform adapted to form a container having the same shape.

The preform can be heated for performing the stretch blow molding by successively performing:

- a first heating step of 3 to 8 seconds, preferably 5.5 to 6.5 seconds,
- a relaxation step where no heating is performed of 3 to 8 seconds, preferably 5.5 to 6.5 seconds,
- a second heating step of 3 to 8 seconds, preferably 5.5 to 6.5 seconds.

Successive heating and relaxation steps can help in avoiding high temperature gradients within the material.

In an embodiment, the method can comprise, at the end of the stretch blow molding step, a cooling step of 1 to 6 seconds, preferably 3 to 4 seconds, during which a mold used for the stretch blow molding remains closed. The method can comprise a step of pre-heating the mold used for the stretch blow molding to a temperature comprised between 8 and 80° C., and preferably between 35° C. and 45° C.

Such provisions can be helpful to unmold the obtained PHA container easily.

The invention also relates to a bottle made of PHA, manufactured by a method as above described.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
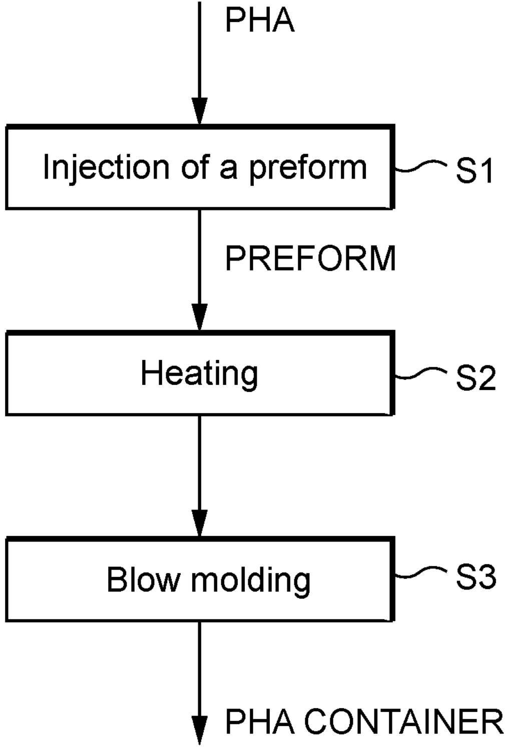
FIG. 1 is a schematic diagram of a process according to an embodiment of the invention.

To form a PHA container such as a bottle according to the invention, a particular grade of Polyhydroxyalkanoate (PHA) is provided.

Composition of PHA

The PHA that is used should be highly biodegradable, depending on the design of the container, and can be even compostable. The containers are preferably made by modifying the PHA with melt strength enhancers, chain extenders, and other processing aids.

As used herein, "compostable" can designate a material that meets the following requirements: the material is capable of being processed in a composting facility for solid waste; if so processed, the material will end up in the final compost; and if the compost is used in the soil, the material will ultimately biodegrade in the soil according to the standard ASTM D6400 for industrial and home compostability.

In particular, the PHA used can have random monomeric repeating units having of the formula

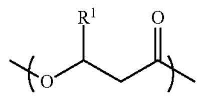

wherein $R^1$ is selected from the group consisting of CH3 and a C3 to C19 alkyl group.

The PHA used can be, for example, a neat poly(hydroxybutyrate-co-hydroxyhexanoate) (PHBHH) containing 97 mol % of polyhydroxybutyrate (PHB) and 3 mol % of polyhydroxyhexanoate PHH. Other neat PHAs can be used, such as a poly(hydroxybutyrate-co-hydroxyhexanoate) (PHBHH) containing 94 mol % of polyhydroxybutyrate (PHB) and 6 mol % of polyhydroxyhexanoate PHH, a poly(hydroxybutyrate-co-hydroxyhexanoate) (PHBHH) containing 91 mol % of polyhydroxybutyrate (PHB) and 9 mol % of polyhydroxyhexanoate PHH, or any neat poly (hydroxybutyrate-co-hydroxyhexanoate) (PHBHH) comprising between 3 mol % and 9 mol % of polyhydroxyhexanoate (PHH).

Optionally, an additive can be added to the neat PHA to form the PHA used. This additive is for example one of pentaerythritol, organic peroxide, an acrylic resin such as Joncryl®, and inositol, or a mix of two or more of these components. The PHA used can comprise between 0% (i.e. no additive) and 1% in weight of additive.

In embodiments, at least about 50 mol %, but less than 100%, of the monomeric repeating units have CH3 as $R^1$, more preferably at least about 60 mol %; more preferably at least about 70 mol %; more preferably at least about 75 to 99 mol %.

In other embodiments, a minor portion of the monomeric repeating units have R1 selected from alkyl groups containing from 3 to 19 carbon atoms. Accordingly, the copolymer may contain from about 0 to about 30 mol %, preferably from about 1 to about 25 mol %, and more particularly from about 2 to about 10 mol % of monomeric repeating units containing a $C_3$ to $C_{19}$ alkyl group as $R^1$.

In some embodiments, the PHA used include from about 40 to about 99 weight percent of poly(hydroxyalkanoate) copolymer and from about 1 to about 60 wt. % additional additives.

In some embodiments, the biodegradable container includes polyhydroxybutyrate as the poly(hydroxyalkanoate).

In other embodiments, the poly(hydroxyalkanoate) copolymer includes poly-3-hydroxybutyrate-co-3-hydroxyhexanoate (P3HB-co-P3HHx).

In some embodiments, the biodegradable container (and the preform) further include from about 1.0 to about 15.0 weight percent of at least one poly(hydroxyalkanoate) comprising from about 25 to about 50 mole percent of a poly(hydroxyalkanoate) selected from the group consisting of poly(hydroxyhexanoate), poly(hydroxyoctanoate), poly (hydroxydecanoate), and mixtures thereof.

In some embodiments, the biodegradable container and the preform further include poly(hydroxyalkanoate)s that include a terpolymer made up from about 75 to about 99.9 mole percent monomer residues of 3-hydroxybutyrate, from about 0.1 to about 25 mole percent monomer residues of 3-hydroxyhexanoate, and from about 0.1 to about 25 mole percent monomer residues of a third 3-hydoxyalkanoate selected from the group consisting of poly(hydroxyhexanoate), poly(hydroxyoctanoate), poly(hydroxydecanoate), and mixtures thereof.

In some embodiments the polymer of the biodegradable container and the preform has a weight average molecular weight ranging from about 50 thousand Daltons to about 2.5 million Daltons.

In other embodiments, the polymer of the biodegradable container and the preform further includes from about 0.1 weight percent to about 10 weight percent of at least one nucleating agent selected from erythritols, pentaerythritols, dipentaerythritols, artificial sweeteners, stearates, sorbitols, mannitols, inositols, polyester waxes, nanoclays, polyhydroxybutyrate, and mixtures thereof.

derivatives or mixtures thereof; polyhydroxyalkanoate copolymers comprising at least 18 mole percent monomer residues of hydroxyalkanoates other than hydroxybutyrate; and mixtures thereof.

Exemplary formulations that may be used to make biodegradable containers according to the disclosure are shown in the following table.

| Formula | PHA polymer wt % 3 mol % Hexanoate in polymer | PHA polymer wt % 6 mol % Hexanoate in polymer | PHA polymer wt % 9 mol % Hexanoate in polymer | Weight % Polylactic acid | Weight % Pentaerythritol | Weight % Organic peroxide | Weight % Joncryl | Weight % Inositol | Weight % Polylactic acid fibers |
|---|---|---|---|---|---|---|---|---|---|
| 1 | 59.34 | — | — | 39.56 | 1 | 0.1 | — | — | — |
| 2 | 69.23 | — | — | 29.67 | 1 | 0.1 | — | — | — |
| 3 | 79.12 | — | — | 19.78 | 1 | 0.1 | — | — | — |
| 4 | 99 | — | — | — | 1 | — | — | — | — |
| 5 | 94 | — | — | 5 | 1 | — | — | — | — |
| 6 | 98.9 | — | — | — | 1 | 0.1 | — | — | — |
| 7 | 65.87 | 32.93 | — | — | 1 | 0.2 | — | — | — |
| 8 | 98.8 | — | — | — | 1 | — | 0.2 | — | — |
| 9 | 24.7 | 74.1 | — | — | 1 | — | 0.2 | — | — |
| 10 | 49.4 | 49.4 | — | — | 1 | — | 0.2 | — | — |
| 11 | 74.1 | 24.7 | — | — | 1 | — | 0.2 | — | — |
| 12 | 93.8 | — | — | — | 1 | — | 0.2 | — | 5 |
| 13 | 49.4 | — | 49.4 | — | 1 | — | 0.2 | — | — |
| 14 | 74.1 | — | 24.7 | — | 1 | — | 0.2 | — | — |
| 15 | 98.2 | — | — | — | 1 | — | 0.8 | — | — |
| 16 | 97.8 | — | — | — | — | — | 0.2 | 2 | — |

In some embodiments, the biodegradable container and the preform further include from about 0.05 weight percent to about 1 weight percent at least one melt strength enhancer chosen from the group consisting of a multifunctional epoxide; an epoxy-functional, styrene-acrylic polymer; an organic peroxide; and a mixture thereof.

In some embodiments the biodegradable container and the preform further include from about 1 weight percent to about 60 weight percent of polymers selected from the group consisting of poly(lactic acid), poly(caprolactone), poly(ethylene sebicate), poly(butylene succinate), and poly(butylene succinate-co-adipate), and copolymers and blends thereof.

In some embodiments, the polymer and the preform further include from about 0.1 weight percent to about 5 weight percent of a reheat agent selected from carbon black, infrared absorbing pigments, and mixtures thereof.

In other embodiments, the polymer and preform further include from about 0.1 weight percent la about 10 weight percent of a tiller selected from calcium carbonate, talc, starch, and the like.

In some embodiments, the biodegradable container and preform further include from about 0.1 weight percent to about 5 weight percent polymeric fibers for structural support, such as stereocomplex poly(lactic acid) (PLA) fibers.

In some embodiments, the biodegradable container and preform further comprise from about 0.1 weight percent to about 3 weight percent of a fatty acid amide slip agent.

In other embodiments, the biodegradable container and preform further comprises up to about 15 weight percent of a plasticizer selected from sebacates; citrates; fatty esters of adipic acid, succinic acid, and glucaric acid; lactates; alkyl diesters; alkyl methyl esters; dibenzoates; propylene carbonate; caprolactone diols having a number average molecular weight from about 200 to about 10,000 g/mol; poly(ethylene) glycols having a number average molecular weight of about 400 to about 10,000 g/mol; esters of vegetable oils; long chain alkyl acids; adipates; glycerols; isosorbide

Synthesis of Biodegradable PHA

To obtain the desired PHA, biological synthesis of the biodegradable PHAs in the present invention may be carried out by fermentation with the proper organism (natural or genetically engineered) with the proper feedstock (single or multicomponent). Biological synthesis may also be carried out with bacterial species genetically engineered to express the copolymers of interest (for example as described in U.S. Pat. No. 5,650,555).

This plastic can be supplied for example in the form of granules suitable for being melted for use in a conventional injection process.

Crystallinity

The volume percent crystallinity (ϕc) of a semi-crystalline polymer (or copolymer) often determines what type of end-use properties the polymer possesses. For example, highly (greater than 50%) crystalline polyethylene polymers are strong and stiff, and suitable for products such as plastic milk containers. Low crystalline polyethylene, on the other hand, is flexible and tough, and is suitable for products such as food wraps and garbage bags. Crystallinity can be determined in a number of ways, including x-ray diffraction, differential scanning calorimetry (DSC), density measurements, and infrared absorption. The most suitable method depends upon the material being tested.

The volume percent crystallinity (ϕc) of the PHA copolymer may vary depending on the mol percentage of P3HHx in the PHA copolymer. The addition of P3HHx effectively lowers the volume percent crystallinity of the PHA copolymer, crystallization rate. and melting temperature while providing an increase in the flexibility and degradability of the copolymer. Nucleating agents, as described herein may be used to speed up the crystallization process of the PHA copolymers.

In general, PHAs used in the present invention preferably have a crystallinity of from about 0.1% to about 99% as measured via x-ray diffraction; more preferably from about 2% to about 80%; more preferably still from about 20% to about 70%, such as about 30% to about 60%.

Melt Temperature

Preferably, the biodegradable PHAs of the present invention have a melt temperature (Tm) of from about 30° C. to about 170° C., more preferably from about 90° C. to about 165° C., more preferably still from about 130° C. to about 160° C.

FIG. 1 is a schematic diagram of a process according to an embodiment of the invention.

In a step of injection of a preform S1, a preform is obtained by injecting the PHA in an adapted injection mold. This comprises injecting molten PHA in the mold, cooling, and unmolding the preform.

Figure 3:
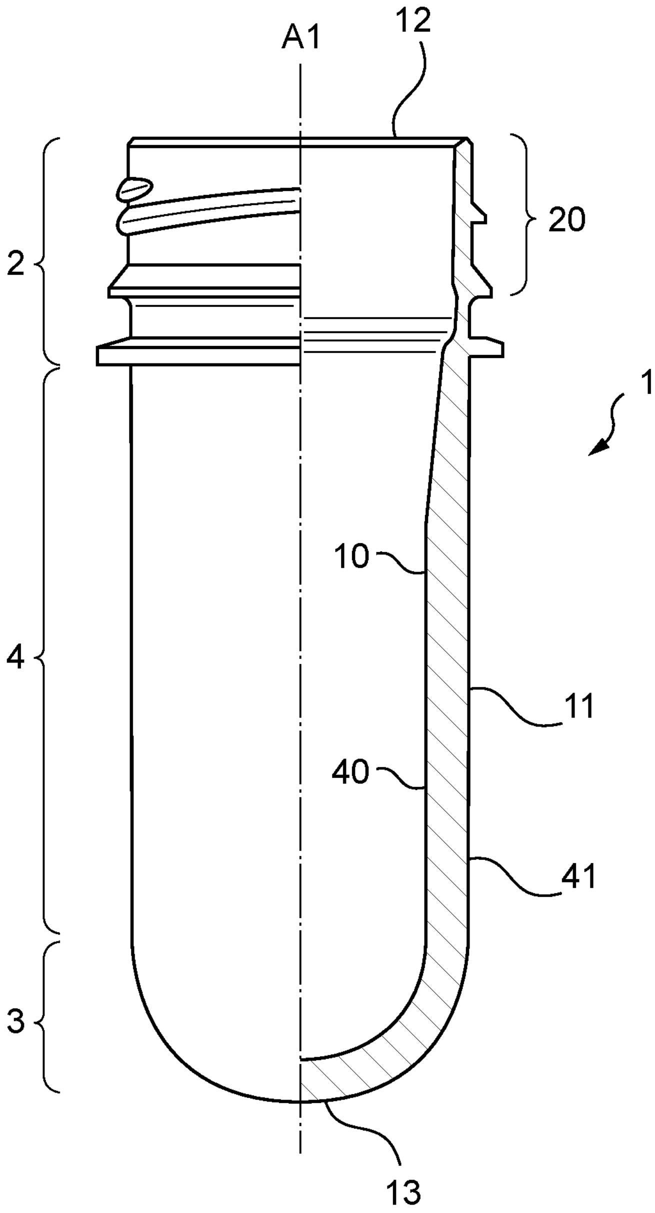
FIG. 3 represents an example embodiment of a preform that can be used in the invention.

An example embodiment of a preform that can be used in the invention and its main features are detailed in FIG. 3. The preform is heated in a step of heating S2. The heating step S2 comprises heating the preform to a temperature between 150° C. and 170° C. The heating temperature must be precise, due to the very narrow vitreous transition range of the PHA. More particularly, depending on the PHA grade, in the heating step the material is heated to a temperature comprised between 1° C. and 8° C. under the melting temperature of the PHA used in the process, which is generally comprised between 90° C. and 165° C., and more preferably between 130° C. and 160° C.

Compared to the heating step of a conventional ISBM process using a PET preform, the heating step has to be adapted. First, a PET preform is heated to a lower temperature (i.e. 80° C. to 120° C.). Also, if a conventional (i.e. generally used for PET) heating system comprising infra-red lamps emitting infra-red having a wavelength of 1.2 to 1.7 μm were to be used, with a conventional heating cycle, high temperature gradients such as 20° C. or more would be generated in the PHA preform, due to a high absorption of such wavelengths at the external PHA surface. The internal surface of the preform would thus have a much lower temperature after the heating step than the external surface. This would not be compatible with the small temperature process window of the PHA for its blowing. A typical process window for blowing PHA can range from 3° C. to 5° C. Gradients of temperature inside the material must therefore be avoided, such that all the parts of the preform that are deformed during the blow molding are in the required temperature range.

Adapted lamp configuration, heating cycle, and/or external surface ventilation are thus advantageously used.

The optimum penetration depth (OPD) of IR radiation for PHA is similar to the OPD of PET, which means that halogen lamps can be used as for PET processing. However, the actual penetration depth is around 4 times higher for PET than for PHA due to high amplitude, spectrally wide, transparency bands present in PET in contrast to PHA. As a consequence, PHA is more prone to be heated only at the surface, leading to a non-uniform temperature distribution in-thickness with a high external and low internal preform temperature. This results in difficulties during a subsequent blowing step as the temperature process window of PHA is significantly narrower than the process window of PET.

Heating step for PHA can be optimized regarding the emission spectra of the source to align with the transparency bands of PHA. This means either to use lamps with a narrower wavelength distribution around 2 micrometer, which is at the maximum transparency band for PHA or to use a standard halogen lamp with an additional filter glass between lamp and preform, which absorbs the lower band wavelengths before they reach the preform surface.

A high ventilation rate around the preform can be used. This reduces the temperature at the external surface of the preform and it homogenizes the temperature around and in the preform. Finally, an adapted heating cycle can be advantageously performed. The following heating cycle was tested with success:

performing a first heating step of 3 to 8 seconds, preferably 5.5 to 6.5 seconds, then preforming a relaxation or "stabilization" step where no heating is performed, during 3 to 8 seconds, preferably 5.5 to 6.5 seconds, performing a second heating step of 3 to 8 seconds, preferably 5.5 to 6.5 seconds.

This heating cycle was in particular successfully tested, with a high ventilation of the external surface of the preform, with the preform of FIG. 3, for obtaining a 50 cl bottle.

A step of blow molding S3 the preform is then performed.

The step of blow molding comprises injecting air at high pressure into the preform, which has been inserted into a mold. The mold has inner walls defining the shape of the final container.

Figure 2:
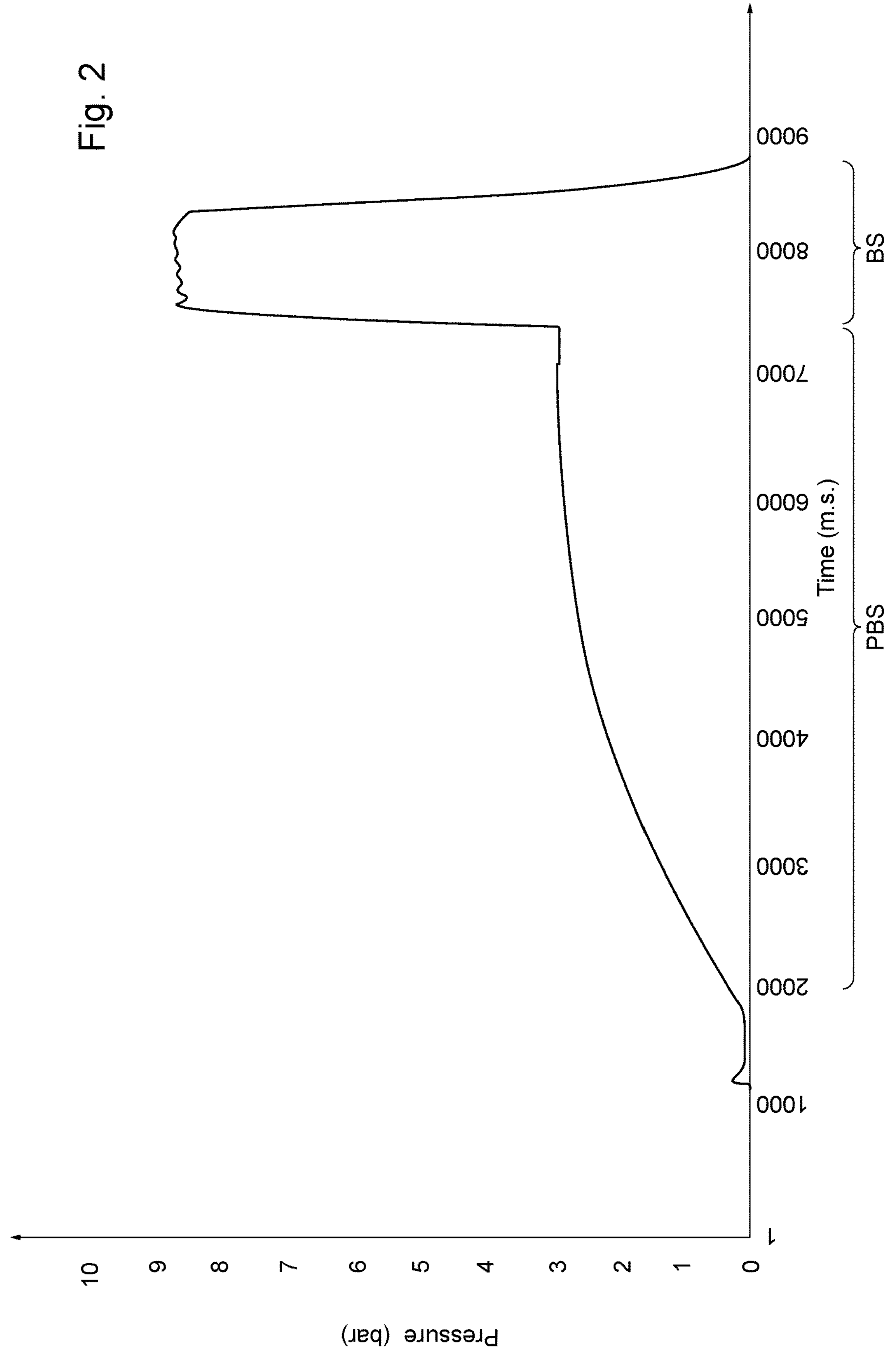
FIG. 2 represents an example embodiment of a pressure curve that can be used in an embodiment of the invention for blow-molding.

FIG. 2 represents an example embodiment of a pressure curve that can be used in an embodiment of the invention for blow molding.

As in conventional blow molding processes, the injection of air can be performed, in the represented embodiment, in two successive steps, namely a pre-blowing step PBS and a blowing step BS.

In the pre-blowing step PBS, air is injected at a pressure comprised between 0.1 bar and 9 bar. Such a value is significantly lower than the values used in the pre-blowing step of a stretch blow molding process of PET (namely 2 bar to 16 bar). The pressure in the preform can rise smoothly or gradually during the pre-blowing step, in the above-mentioned pressure range.

The pre-blowing step lasts between 0.5 s and 6 s

In the example curve of FIG. 2 the pre-blowing step PBS comprises a smooth increase of the pressure in the mold up to around 3 bars, that lasts about 5.5 s.

Such a low pressure and low-pressure increase rate can be obtained by forming a section restriction in a conventional ISBM system. The air can for example be injected into the mold through a section restriction comprised between 0.2 $mm^2$ and 20 $mm^2$. A valve can be used to form this section restriction.

The pre-blowing step PBS can be, in some cases, sufficient to pressurize the preform which is deformed against the walls of the mold. In such case, no further blowing is necessary. In most cases, the pre-blowing step is followed by a blowing step. The blowing step BS comprises injecting air at higher pressure than in the pre-blowing step, at a pressure that may be up to 15 bar. In the blowing step, the pressure rises quickly in the mold. This is not problematic, since this step causes limited deformations of the material: it aims to press the deformed preform against the walls of the mold, in order to give it the details of the final shape of the container. The blowing step BS can last between 0 s (i.e. no blowing step is performed) and 4 s. In the example curve of FIG. 2, the blowing step comprises a sudden rise of the pressure in the mold to 8.5 bar that lasts about 0.8 s.

The performed stretch blow molding, and more particularly the pre-blowing step PBS at a relatively low pressure makes it possible to obtain a reduced stretching speed (compared to PET blow molding), adapted to the lower melt strength of the PHA.

After the blow molding step S3, the mold is opened and a PHA container is thus obtained.

A heated mold can be used in some embodiments of the invention. While it is optional, better results can be achieved with such pre-heated molds to avoid immediate sticking of PHA in the mold. The temperature of the mold can be set between 8° C. and 80° C., preferably between 35° C. and 45° C.

FIG. 3 represents an example embodiment of a preform that can be used in the invention. More particularly, FIG. 3 is a half-sectional view of a preform having a configuration optimized for PHA ISBM.

The design and structure of the PHA preform has a significant effect on the reheat behavior of the preform, the temperature profile of the preform and the blowability of the preform upon reheating.

As with a conventional preform (i.e. for PET blow molding), the preform 1 comprises a neck portion 2, a base portion 3 and a body portion 4. The body portion 4 extends between the neck portion 2 and the base portion 3, along a longitudinal axis A1. The preform 1 presents the shape of a test tube.

In the represented embodiment, the preform has a circular cross-section.

The preform 1 has a smooth inner surface 10 and an outer surface 11. Other configurations can be used, that have a non-circular cross-section and/or ribs formed on the inner surface or the outer surface.

The neck portion 2 extends at an open first end 12 of the preform 1. The neck portion 2 has a substantially tubular shape.

The neck portion 2 comprises a threaded part 20. Once the bottle has been manufactured starting from the preform 1, the threaded part 20 is intended to cooperate with a threaded top able to close the bottle.

The base portion 3 extends at a closed second end 13 of the preform 1. The base portion 3 has a substantially hemispherical shape. The base portion 3 can present a different shape, such as a substantially conical shape, in other embodiments.

The body portion 4 comprises a wall having an inner surface 40 and an outer surface 41. The body portion 4 has here a tubular shape. The inner surface 40 and the outer surface 41 have thus a substantially circular cross-section.

The neck portion 2 and the base portion 3 have respectively a substantially homogeneous thickness. In other words, the distance between an inner surface and an outer surface respectively of the neck portion 2 and the base portion 3 is constant across any transverse cross-section of each of said portions.

The preform 1 has however a shape that is optimised for PHA stretch blow molding. More particularly, the diameter of the preform (in the preferred embodiment of the invention in which the preform has a circular cross-section) is comprised between 25% and 50% of its length, preferably around 33% of its length.

This means that the preform 1 is shorter with greater diameter compared to a conventional preform. More importantly, because the body portion 4 and the base 3 portion are deformed during the step of performing a stretch blow molding of the preform while the neck portion 2 is essentially not deformed, the preform has a diameter comprised between 30% and 60% of the length of the body portion and base portion, measured along the longitudinal axis (A1), preferably around 45% of its length.

A preform made of a PHA and intended to be stretch blow molded according to the invention is thus configured to require a lower ratio of axial to radial stretch to take the final shape of the formed container, compared to a corresponding PET preform adapted to form a container having the same shape.

The ratio between the longitudinal dimension of the body portion 4 and the base portion 3 of the preform and the wall thickness taken along any transverse cross-section is at least equal to a 15, and preferably ranging between 15 and 40.

The thickness of the body portion of the preform can range between 1.5 millimetres and 5 millimetres, and more preferably between 1.5 millimetres and 3.5 millimetres. An advantage of using a PHA preform having a uniform wall thickness throughout the body portion is that the uniform wall thickness helps to keep the temperature consistent throughout the preform during heating and melting.

In some embodiments, the preform, after being reheated, has a final mass to height ratio ranging from about 0.4 to about 0.5 grams/mm.

Advantageously, the preform is relatively short and have a relatively high mass to height ratio. This is particularly obtained with the values presented above for the length and mass to height ratio. The relatively short, relatively thick preform provides more consistent and repeatable results, deforming less after reheating. Additionally, the short, thick preforms give better regulation of material flow in the container mold during blowing, as there are less differences in material temperature throughout the preform, giving less areas that are prone to blow-outs throughout the material.

The method has been successfully tested for example with a preform having the following initial features:

- an overall length of 81 mm,
- a neck portion having a length of 21.5 mm,
- a circular cross-section having an external diameter of 28 mm, and
- a substantially constant wall thickness of 3.5 mm.

This 25 grams preform was adapted to form a 50 cl bottle.

A stretch rod speed between 0.1 and 0.5 m/s was successfully used with a stretch rod diameter of 8 to 14 mm. These values are adapted to the relatively low stretching speed used in PHA stretch blow molding.

As conclusion regarding the impact of the preform shape on the ISBM process, it was observed that the preform design is important for controlling deformation of the preform during reheating.

The shortest preforms deformed less than taller preforms, but were still pliable and had less deformation upon reheating.

The longest preforms had more issues with uniformity and repeatability during reheating.

The shortest preforms with thicker walls made bigger free-blown articles and were less prone to blow outs during reheating compared to the taller preforms The shortest preforms also had more uniformity of material distribution during reheating than taller preforms.

During reheating, the shortest preforms had a colder inside temperature but also a smaller temperature differential throughout the length of the preform than taller preforms. Preforms 12 and 14 had much greater temperature differentials throughout the length of the preforms during reheating.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A method for manufacturing a plastic container, the method comprising:

providing an injected preform, heating the preform, and performing stretch blow molding of the preform, thereby forming the container wherein, the preform is made of a material comprising 40 to 99.9 weight percent of Polyhydroxyalkanoate (PHA), in the heating step, the preform is brought to a temperature of between 1 C and 20° C. under the melting temperature of the PHA, and the container further comprises poly(hydroxyalkanoate) s comprising a terpolymer made up from 75 to 99.9 mole percent monomer residues of 3-hydroxybutyrate, from 0.1 to 25 mole percent monomer residues of 3-hydroxyhexanoate, and from 0.1 to 25 mole percent monomer residues of a third 3-hydoxyalkanoate selected from the group consisting of poly(hydroxyhexanoate), poly(hydroxyoctanoate), poly(hydroxydecanoate), and mixtures thereof.

2. The method according to claim 1, wherein the PHA has random monomeric repeating units having of the formula:

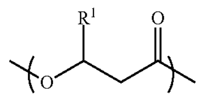

wherein $R^1$ is selected from the group consisting of CH3 and a C3 to C19 alkyl group.

3. The method according to claim 1, wherein the container comprises from about 40 to about 99 weight percent of poly(hydroxyalkanoate) copolymer.

4. The method according to claim 3, wherein the poly (hydroxyalkanoate) copolymer comprises poly-3-hydroxybutyrate-co-3-hydroxyhexanoate (P3HB-co-P3HHx).

5. The method according to claim 1, wherein the container further comprises from 0 to 15.0 weight percent of at least one poly(hydroxyalkanoate) comprising from 25 to 50 mole percent of a poly(hydroxyalkanoate) selected from the group consisting of poly(hydroxyhexanoate), poly(hydroxyoctanoate), poly(hydroxydecanoate), and mixtures thereof.

6. The method according to claim 1, wherein in the heating step the preform is brought to a temperature between 150° C. and 170° C.

7. The method according to claim 1, wherein the stretch blow molding comprises a pre-blowing step (PBS) wherein air is injected at a pressure comprised between 0.1 and 9 bars.

8. The method according to claim 7, wherein the pre-blowing step (PBS) lasts between 0.5 s and 6 s.

9. The method according to claim 7, wherein the stretch blow molding comprises a blowing step (BS) wherein air is injected at a pressure comprised between 0 and 15 bars.

10. The method according to claim 9, wherein the blowing step (BS) lasts between 0 s and 4 s.

11. The method according to claim 1, wherein the stretch blow molding comprises injecting air through a section restriction comprised between 0.2 $mm^2$ and 20 $mm^2$.

12. The method according to claim 1, wherein the preform has a tubular general shape and extends along a longitudinal axis, the preform comprising a neck portion, a body portion and an base portion, the body portion and the base portion being deformed during the step of performing a stretch blow molding of the preform, and the preform has an external diameter of 30% and 60% of the length of the body portion and base portion, measured along the longitudinal axis.

13. The method according to claim 1, wherein the preform weighs between 20 g and 80 g.

14. The method according to claim 1, wherein the preform is heated for performing the stretch blow molding by successively performing:

a first heating step of 3 to 8 seconds, a relaxation step where no heating is performed of 3 to 8 seconds, a second heating step of 3 to 8 seconds.

15. The method according to claim 1, further comprising, at the end of the step of performing a stretch blow molding, a cooling step of 1 to 6 seconds, during which a mold used for the stretch blow molding remains closed.

16. The method according to claim 1, further comprising a step of pre-heating the mold used for the stretch blow molding to a temperature comprised between 8 and 80° C.

17. The method according to claim 12, wherein the external diameter of the preform is approximately 45% of the length of the body portion and base portion.

18. The method according to claim 12, wherein a ratio between the length of the body portion and base portion of the preform and a wall thickness of the preform is between 15 and 40.

19. The method according to claim 1, wherein a wall thickness of the preform is between 1.5 mm and 5 mm.

* * * * *